Aug. 3, 1926.
C. H. THORDARSON
ELECTRICAL COIL
Original Filed Oct. 27, 1920
1,594,647
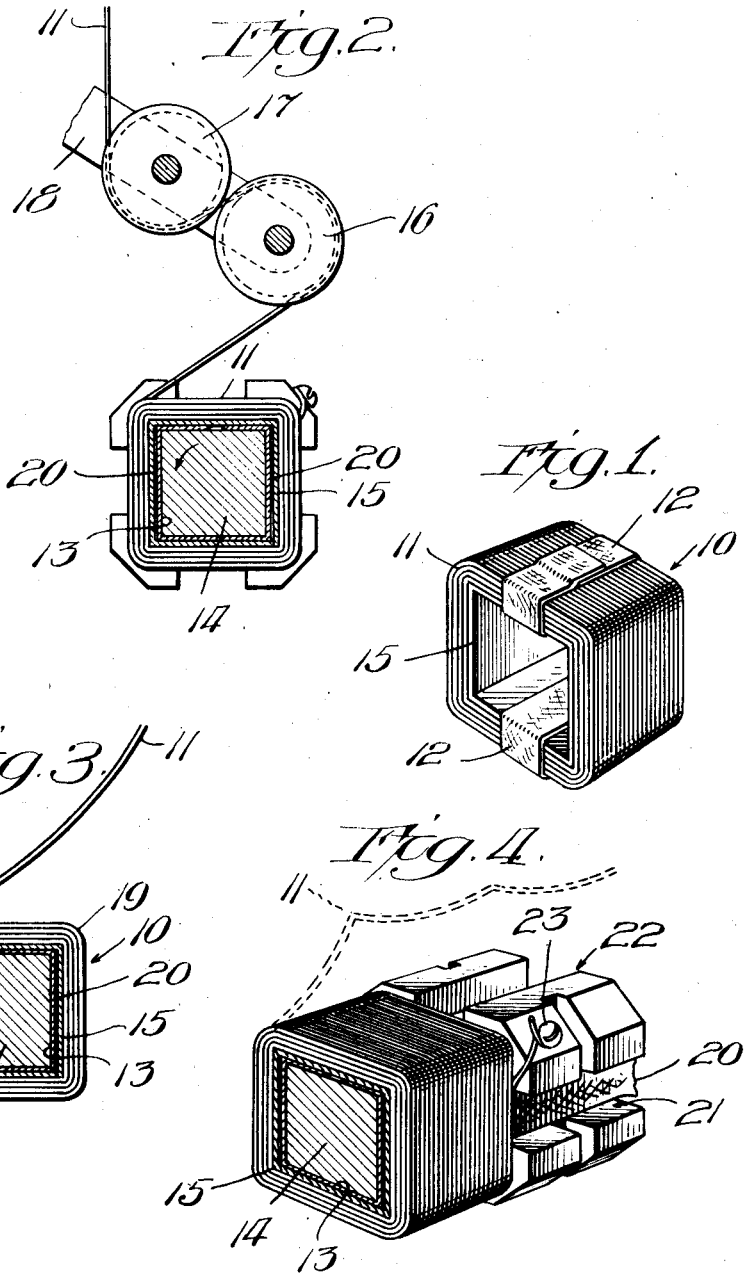
Inventor:
Chester H. Thordarson
by [signature]
Atty Patented Aug. 3, 1926.

1,594,647

UNITED STATES PATENT OFFICE.

CHESTER H. THORDARSON, OF CHICAGO, ILLINOIS.

ELECTRICAL COIL.

Original application filed October 27, 1920, Serial No. 420,049. Divided and this application filed January 28, 1924. Serial No. 688,956.

This invention relates to a novel coil or winding for electrical devices such as transformers and the like, and particularly to a polysided coil, either square or oblong, presenting exterior angles between their flat sides.

The invention refers more particularly to a coil which is so constructed that the parts of each turn of the coil or winding which lie in the straight parts of the coil between exterior angles are preformed to give a permanent set to said parts, to cause said parts of the turns to tend toward the axis of the coil and thereby prevent the conductor or wire from loosening and from bulging outwardly away from the straight sides of the coil or winding, and also reducing liability of the insulation from being scraped off the turns. The construction also results in a very compact winding in which a large number of turns can be wound in a small space, thus reducing the dimensions of the coil or winding as a whole and improving the electro-magnetic function of the coil or winding.

I have shown in the drawings one embodiment of the invention, wherein the conductors of the coil are assumed to be insulated by an enamel coating, and have also illustrated in the drawings one form of mechanism by which the coil is made, the latter to better illustrate the construction of the coil or winding. The method of making the coil is shown and claimed in my prior Patent No. 1,482,951 dated February 5, 1924, of which the present application is a division.

As shown in the drawings:

Figure 1 is a perspective view of a coil embodying my invention.

Figures 2, 3, and 4 illustrate diagrammatically mechanism for winding the coil and illustrates the method of winding the coil on a supporting bobbin.

The coil 10 shown in Figure 1 is made up of a number of turns 11 of enamel insulated wire. The dimension of the coil may be greatly varied, either shortened or lengthened, as compared to that shown in Figure 1, and the wire or conductor 11 may be insulated by a fabric insulation, such as silk. The turns may be held together by means of taping bands 12 which are assembled in the coil structure during the winding operation. As shown in Figure 1 and the remaining figures, the gauge of the wire turns is considerably greater than would be indicated by the illustrated coil dimensions, for the purpose of showing the relation of the parts of the winding turns and their relation to the winding mechanisms. It will be understood that the turns of the conductor may vary considerably in gauge dimensions and that the coil or winding may also be made of any practical dimension desired.

The coil or winding is shown as formed by laying the wire or conductor on a collapsible shell-like bobbin 13 that may be supported on a rotative bobbin support 14 or, preferably and in practice, laid directly on an inner coil or winding support 15 made of paper board, fibre or the like and which constitutes a unitary part of the finished coil.

The bobbin support can be assumed to be rotated by any suitable means, such, for instance, as that illustrated in my co-pending application for United States Letters Patent S. N. 425,317, filed November 20, 1920, and the wire or conductor 11 can also be assumed to be taken from a reel on such a machine and led to the coil or winding support 15 and forming coil about parts of the peripheries of presetting and laying on discs 16, 17 which are supported to rotate freely on shafts that are mounted on an arm or arms 18 which, in the machine shown in the last aforementioned application, is caused to travel in a direction parallel to the axis of the bobbin support to spirally lay the turns on the inner support 15 or the forming bobbin.

The discs 16, 17 serve to preform the wire or conductor 11 just before it is wound upon or enters the coil or winding structure and thus giving to the parts of the turns as they enter the coil a preset in a manner to cause them to tend towards the center of the coil or winding between the exterior angles 19 thereof, as shown in Figures 1 and 2. Thus, when the turn parts are laid on the coil or winding support 15 and on the forming coil, the inwardly curved or pre-set portions of the turns lie flat in the sides of the coil or winding between its exterior angles and with a tendency to press toward the center of the coil or winding.

The turn parts thus pressed and thereafter assembled in the coil has the effect to prevent said parts between the exterior angles 19 from becoming loose and bulging away from the center of the coil or winding. In the coil so made the turn parts at the flat sides of the coil are condensed or compacted. The coil is, therefore, more rugged as compared to prior coils or windings because the winding does not tend to uncoil, thus giving to the flat sides of the coil, as well as at the angles thereof, permanent solidity and overcoming the liability of counter movement of the turn parts which would have the effect of rubbing or scraping the insulation from the turn parts.

The taping bands 12 when employed are assembled in the winding by applying them between the collapsible bobbin shell 13 and the winding or coil support 15 in the first part of the winding operation, and thereafter cutting the tapes and folding them over the exterior sides of the windings or coils in end overlapped relation and cementing the ends together, as shown in Figure 1.

A bobbin structure for this purpose is shown in Figure 4, wherein the tapes 20 to produce the tape bands 12 are laid in recesses 21 formed in an enlarged portion 22 of the bobbin structure in planes parallel to each other and an intermediate plane passed through the axis of the bobbin support. The parts of the tapes, during the winding operation, lie between said shell 13 and said support 15, as best shown in Figures 2, 3 and 4. When employing a bobbin of the type shown, the extremity of the innermost turn can be fastened to a screw 23 threaded into the enlarged end of the bobbin structure.

The dotted lines indicate in Figure 4 a raised partial turn of the winding, and indicate the pre-set which has been given to the turn parts before the wire enters the coil, and which remains, in the wound coil, as a factor to cause the turns to lie flat in the sides of the coil or winding.

I claim as my invention:

1. A polysided electric coil or winding composed of a number of spirally wound turns, the turn parts in the flat sides of the coil or winding between exterior angles thereof having a set to tend toward the center of the coil.

2. A polysided electric coil or winding comprising an inner insulating polysided support and a plurality of spirally wound turn parts applied to said support, the turn parts in the flat sides of the coil having an inward set.

3. A polysided electric coil or winding comprising a number of spirally wound turns, the turn parts in the flat sides of the coil or winding having a set to tend toward the center of the coil, and tapes enclosing the flat sides of the coil or winding between the exterior angles thereof.

In witness whereof I claim the foregoing as my invention, I hereunto append my signature this 25th day of January, 1924.

CHESTER H. THORDARSON.